United States Patent
Frattalone

(10) Patent No.: US 8,676,678 B2
(45) Date of Patent: Mar. 18, 2014

(54) LONG-TERM PROPERTY ACQUISITION AND PAYMENT METHOD

(76) Inventor: Nicholas Frattalone, Hampton, NJ (US)

( * ) Notice: Subject to any disclaimer, the term of this patent is extended or adjusted under 35 U.S.C. 154(b) by 445 days.

(21) Appl. No.: 10/722,730

(22) Filed: Nov. 26, 2003

(65) Prior Publication Data

US 2004/0143529 A1 Jul. 22, 2004

Related U.S. Application Data

(60) Provisional application No. 60/429,667, filed on Nov. 27, 2002.

(51) Int. Cl.
*G06Q 40/00* (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS

| | | | |
|---|---|---|---|
| 5,680,305 A | 10/1997 | Apgar, IV | 364/401 |
| 6,167,384 A | 12/2000 | Graff | |
| 6,292,788 B1 | 9/2001 | Roberts et al. | 705/36 |
| 2002/0138419 A1 * | 9/2002 | Melone et al. | 705/38 |
| 2003/0225665 A1 * | 12/2003 | Gross et al. | 705/36 |

OTHER PUBLICATIONS

SBA Communications Corporations Announces 2$^{nd}$ Quarter Results; Accelerates Tower Ownership (Aug. 14, 1998).*
SBA Communications Corp. Website (sbasite.com).*

* cited by examiner

*Primary Examiner* — Daniel Felten
(74) *Attorney, Agent, or Firm* — Fox Rothschild LLP; Peter J. Butch, III

(57) ABSTRACT

Methods for the long-term leasing by a company of a plurality of properties, two or more of which are separately owned by identifying each property to be leased; and tendering to each property owner an offer to lease each property for a term of years with a lump sum payment as consideration.

18 Claims, No Drawings

LONG-TERM PROPERTY ACQUISITION AND PAYMENT METHOD

CROSS-REFERENCE TO RELATED APPLICATION

This application is related to and claims priority benefit under 35 U.S.C. §119(e) of U.S. Provisional Patent Application No. 60/429,667 filed Nov. 27, 2002, the disclosure of which is hereby incorporated herein by reference.

FIELD OF THE INVENTION

The present invention relates generally to acquiring the right to use all or portion of parcels of real property for long periods of time. In particular, the present invention relates to a method for implementing a site acquisition strategy and financing approach for establishing and maintaining wireless communications networks residing at cell tower sites.

BACKGROUND OF THE INVENTION

Until now, companies engaged in network build-outs for wireless communications facilities follow a similar if not identical method for acquiring the use of land necessary to establish their networks. Site selections are determined by dropped call rates as well as the quality of reception. We have all seen the clever "Can you hear me now?" ads used by Verizon Communications. In fact, this is one of the methods that are used to determine what locations are needed for the development of networks. Once general areas of need are determined, a radio frequency engineer establishes a range of acceptability within each general area by drawing a circle on a topographical map that indicates the area within which a site should be located in order to establish the best possible coverage to create a seamless communications network.

The next step is to find the best site within the given range, topography and proximity to major roads considered, and then identify what specific property within that range best satisfies the need. It must be noted that there are instances when a property owner who believes his or her property would be a suitable site will make the first inquiry, but in most instances "locators" are sent to approach the property owner first, having knowledge of a specific need.

In virtually all cases, the companies engaged in site development will make the first offer by disclosing an industry standard or in other words, "a typical lease arrangement". This disclosure will include a range of rent and will then set the starting point and course of the negotiation to acquire the rights to use the prospective site. The industry standard has generally been to offer a three to five year lease with renewal options as far out as approximately 30 years. Rents offered will vary from locale to locale and are directly affected by the population density and or amount of traffic (customers).

Wireless companies generally cooperate with each other as it relates to sharing locations. This is primarily due to the Government's desire to restrict the number and placement of cell towers and the initial capital outlay required to develop a new site. These considerations make it mutually beneficial to share locations. Therefore, companies will sublease locations to each other and collect rents commonly referred to as co-location rent. Thus, it is also common for co-location rent to be paid to property owners, in addition to lease payments, whereby the revenues generated from subleases to other companies using the same facility are shared with the property owner.

The aforementioned practices are common in the industry and represent a major flaw in how long term property rights are acquired for desired locations. The current method readily accepts long-term balance sheet liabilities without resistance. Accordingly, these long-term liabilities either grow or diminish proportionately with network expansion and place wireless companies in demonstrably weakened financial positions. What is needed is a property acquisition method and strategy that purposefully seeks to eliminate or reduce these burdensome long-term financial obligations currently experienced by the companies that have been engaged in the aforementioned prior art practices. In particular, there exists a need for a rent reduction strategy, less costly methods by which parcels of land are acquired for wireless network build-outs.

SUMMARY OF THE INVENTION

This need is met by the present invention. The present invention provides a system and method for long-term acquisitions and financing of real estate that it is substantially more beneficial for a an entity requiring property rights to many parcels of land and is contrary to the current methods presently in widespread use. Rather than seek the usual and customary commercial or ground lease type of agreement for the long-term use of a property, this method actively promotes, as an overriding discipline and standard business practice, all cash, or its equivalent, upfront, or, in the alternative, short-term lump-sum payments for the long-term right to use a property, preferably a parcel of land. The term "Lump Sum" as used through out this application is considered to include any method of payment (consideration) to a landowner that decreases the number of and duration of payments needed to acquire the right to use a parcel of land.

Therefore, according to one aspect of the present invention, a method is provided for the long-term leasing by a company of a plurality of properties, two or more of which are separately owned, including the steps of identifying each property to be leased, and tendering to each property owner an offer to lease each property for a term of years with a lump sum payment as consideration. The properties are preferably parcels of land, and more preferably the land is within an area where a wireless communications facility such as a cell tower is needed for a wireless communications network and contains a location desirable for positioning said facility. Under such circumstances, the offer may be made to lease all of said parcel or only a portion of the parcel containing the desirable location and access thereto, if necessary.

The prior art methods fail to take into account the fundamental differences between a private property owner and a property owner who is engaged in commercial leasing for gain. The differences can be dramatic when understood and factored into the negotiation process in a thoughtful manner. By failing to appreciate this, the companies presently engaged have consistently used the wrong approach and thusly overpaid for the right to build cell towers on properties of interest. Moreover, the prior art has not considered that there are other financial benefits that although not directly related to communications networks but more related to profits derived from real estate ownership and development This new method seeks to capitalize on any such other financial benefits during the analysis and negotiation phase of each prospective acquisition.

This is achieved by consciously and purposefully widening the scope of the undertaking from a single purpose mindset (Communications network) to include considering the present and future real estate value and or its potential as a separate profit center. In doing so, a salable asset may also be attainable. Although the business of profiting through real estate ownership and development is extraneous to operating a communications network, both are, as it relates to the negotiation and acquisition process, rudimentary and indistinguishable from each other at their core and should therefore be a part of the thought process where applicable during the negotiating process.

In a preferred embodiment, based on research that seeks to identify and quantify the total of all debt encumbering a particular parcel as well as understanding its current and potential value as a real estate investment, the amount of cash is estimated that, if paid upfront to a property owner in lieu of a typical lease agreement, would cause a private property owner to ask the question; "Am I better off taking the cash." Having a Lump sum cash option now available for consideration when before now it was not, a new thought process is now added to the equation for consideration by the property owner. The overall debt encumbering a particular property would be a good starting number on which to formulate an initial offer and begin negotiation.

Therefore, according to a preferred embodiment of the present invention, the method of the invention further includes the steps of determining the amount of debt encumbering each property and calculating for each encumbered property a lump sum payment (s) in a subjective range with it's center approximately near to the amount of debt encumbering the property. Presenting the property owner with a menu of various acquisition options that include the Lump Sum Payment option along with or independent of the industry standard typical lease arrangements facilitates the offering method according to this embodiment.

In another preferred embodiment the lease offer includes either or both a purchase option and first right of refusal in favor of the company, to provide the company with the opportunity to acquire outright the ownership of the location of interest. In one method provided according to this embodiment of the present invention, at least one offer further includes a first right of refusal for the company to purchase the parcel of land, or a portion of the parcel within which the desirable location is situated, and access thereto, if necessary, if the landowner receives a purchase offer for the parcel, for which the lump sum payment also serves as consideration. In another method provided according to this embodiment of the invention, at least one offer further includes an option exercisable by the property owner to sell to the company at a predetermined price the parcel of land, or a portion thereof on which the desirable location is situated, and access thereto, if necessary, for which the lump sum payment also serves as consideration.

The invention recognizes and contemplates that not every property owner will accept a lump sum payment for a long-term property lease. However if lump sum offers are implemented as a standard business practice on a national scale, preferably with step by step standard guidelines presented within a menu of options, the method of the present invention will be successful with many locations, both new and existing. Even if only a very small percentage of landowners accept this payment method, the result is an increase in profitability Operating cash flow is increased and long-term payment liability is reduced.

Preferred methods according to the present invention incorporate into lease agreements for property owners who will not negotiate a single, up-front payment property lease, an option in favor of the property owner for an all cash take out that will expire somewhere in the first or second term of the overall lease period. Methods provided according to this embodiment of the present invention thus further include, when an offer is refused, the step of tendering to each refusing landowner an offer to lease their property for a term of years with periodic rental payments over the term of the lease, with the balance payable as a lump sum at a predetermined discount at the option of the landowner at any time during the term of the lease. More preferred methods also further include the above-discussed purchase option or first right of refusal in favor of the Company.

The method of the present invention is most successful when implemented as a network-wide standardized company policy that contains at its core, the goal of an all cash (or equivalent thereof) transaction and includes the menu of options that are offered to prospective property owners and current leases, expired or otherwise. Further features and advantages of the invention will become more readily apparent from the following detailed description of preferred embodiments.

DETAILED DESCRIPTION OF PREFERRED EMBODIMENTS

Most people who are approached by wireless telephone companies to locate a cell tower on their property see it is a windfall, a stroke of fortune akin to winning a lottery. The property is leased with rent paid monthly over a fixed term, typically 25 to 30 years if all options are exercised. Wireless firms often provided a share in the profit derived from "co-locators." Lease payments range as high as $2,500 per month with sharing up to 25% of "co-locator" fees. The approach as wireless companies are now using it fails to consider the nature of the private property owner, approaching every property owner as if they were in the commercial leasing business. Private property owners often have more immediate goals and different mindsets then their commercial counterparts. Creating an acquisition strategy that takes this into account can produce a much different outcome for the company. There are many people who if offered the opportunity for all cash upfront would find it much more attractive.

Like most lottery winners, they would prefer to receive a large sum of money immediately than receive a more substantial sum spread out in much smaller payments over a period of time extending for decades. Additionally, there will be some property owners who feel that it is better to take a sure thing rather than gamble that all lease options will in fact be exercised. According to the present invention, rather than seek the usual and customary commercial or ground lease type of agreement for the long-term use of a property, a wireless company would actively promote network-wide, as an overriding and standard business practice, all cash upfront transactions for the long-term right to use a property. A loan cost analysis would preferably be used to determine what the carrying charges would be if the up-front cash was borrowed and amortized over a 5 to 7 year term. To some extent this is analogous to a purchase option agreement, right of way or temporary use easement vs. a lease.

For example, it is believed by many experts in the telecommunications industry that there are no suitable or cost effective substitutes on the horizon for the present need for ground based wireless communications sites (Cellular Tower Sites) that would eliminate their need, such as satellites. At present, line of sight technology is necessary. Therefore in order to improve on the present ground based technology and obviate the need for as many locations, new technology must provide for "looking around" obstacles such as mountains as well as increase the effective distance needed to maintain reliable service. When negotiating the lease of a suitable site, one must view the time needed for use of that site after considering that new technology may eliminate the need for such a site in the future.

To complete the example, it is assumed that a site is needed for 20 years and the rent is $2,000 per month. For simplicity, such things as co-location income and consumer price index increases are not factored, but in a real agreement, they would more likely than not, be a significant factor. In a long-term lease with periodic rent payments, at $2,000 per month the rent over a 20-year period equals $480,000. A property owner, in many circumstances may find it more advantageous to receive a substantial upfront payment in lieu of receiving income over 20 years. For example, a property owner with a first mortgage of $150,000 may prefer if the $150,000 mortgage is paid in full, relieving him or her of monthly mortgage payments instead of receiving periodic monthly payments. In addition, current tax law provides that the $150,000 would be received tax-free. This is but one possible scenario under which a property owner would prefer to receive a large sum of cash up-front in lieu of periodic payments.

For each property owner who accepts such a proposition, the company or party interested in using the property paying the amount of $150,000 may either, finance this amount, pay it from existing cash reserves, or use an equivalent form of payment such as zero coupon bond with a higher maturity rate but which is discounted to the purchaser. All such front loaded payment methods have the beneficial effect of reducing long-term liability as well as other benefits as is set-forth herein.

By adopting the lump sum payment method a wireless company or tower development company would be eligible to capitalize the entire upfront cash expense. It might then be taken off the Profit and Loss Statement and placed on the Balance Sheet. Preferably, company accountants are allowed to provide input regarding the Company's financial posture at the time each location is negotiated.

The payment made to the property owner may be entirely capitalized, or expensed as pre-paid rent. In addition, all of what were previously lease payments using the standard lease agreement and long-term liabilities, are now no longer an on-going expense. What was a cash-draining long-term liability is converted to a short-term expense.

Preferably, the wireless company increases its potential profit center by also keeping all sums that were formerly paid as "co-location revenue." Not every property owner will accept such terms. But such terms should at least be sought as part of an initial lease offer.

Up-front cash payments according to the present invention are not limited to currency, but also include essentially any negotiable security with a reasonable degree of liquidity. Thus, according to one embodiment of the present invention, a property owner is offered a zero coupon bond with a higher face value than it actual cost the Company. At present seven-year bonds can be acquired at an approximate 70% discount. For example, a 7-10 year Zero Coupon Bond with a face value of $250,000 will cost approximately $175,000. In yet another alternative, there may be property owners who would be receptive to receiving stock, stock options or other negotiable securities as payment in full. Essentially any combination of the above forms of consideration will eliminate long-term payment liabilities and at the same time produce a substantial increase in revenue.

The financing for such arrangements over an entire network of multiple property owners can be structured to improve profitability for the wireless company. Negotiable securities also can be used to collateralize the financing to obtain the cash to pay the property owner. For example, a three-step transaction can be employed, wherein the company purchases a Zero Coupon Bond, offers it as collateral to a bank, receives the cash, and pays the property owner. After the loan is repaid to the bank, the company benefits from the bond discount. Or, the company can simply exchange the bond for the land use.

Once a site is decided on, it should be a priority to learn of the market value of the property, existing mortgages, liens and total encumbrances to determine if it would be a feasible starting point as an up-front payment offer, and work the numbers from there. At present this task is performed to identify encumbrances after a typical lease transaction has been negotiated, without consideration for what other potential profit may be available from the real estate alone and not connected to the communications aspect.

The method of the invention places ending dates on payment liability and limits the downside should technological advances cause locations to become technologically obsolete. For example, if an area presently requires three cell tower locations three miles apart, and then there is an advance in technology that allows only two towers to cover the same area, the liability to continue payment for the remainder of the current renewal period will have been eliminated.

First right of refusals or purchase options with predetermined option prices are preferably a permanent provision sought in all initial term and renewal lease agreements, whether or not they are based on a lump sum cash payment. This provides the company with the ability to acquire land outright if desired, rather than face the prospect of renegotiating leases in the future when economic conditions may not be favorable but there is still a need for the location.

The purchase option or right of first refusal may cover the entire plot of land offered for sale by the property owner, or it may be limited to a portion of land surrounding the location of interest, including access rights, if necessary. This may require the property owner to subdivide the land. Thus, a first right of refusal may contain the right to purchase a fraction of the land subject to an offer for sale at a directly proportional fraction of the price. And the property owner may provide an option to sell the company just a portion of the land surrounding the location of interest at a predetermined price. First right of refusal and purchase options are preferably structured and valued so that the land is ultimately acquired for less consideration than would be paid in total over the term of the lease agreement If a lump sum transaction cannot be negotiated, negotiating a long term lease having periodic rental payments with a discounted lump sum take-out provides the company the means to entice the property owner to cash-out the lease according to the method of the present invention should circumstances change for whatever reason. The discount would be calculated based on the amount of term remaining and would preferably amortize at an accelerated rate to encourage property owners to cash out sooner rather than later.

The method of the present invention is also applicable to the leasing of properties that have never been leased, as well as to leases that are about to expire, and can even be used to renegotiate long-term leases with periodic rent payments that have years to run. Each type of lease and circumstance would have its own strategy centered around reducing the amount and duration of rent payments. Existing lease transactions where at the time of initial negotiation the property owner had nothing to compare to and where the company had negotiated a relatively low rental rate are prime candidates to renegotiate using this method. The method of the present invention becomes particularly important as leases expire on the first cell towers that were built at the advent of wireless communication systems.

Wireless companies may also outsource or joint venture the operation with a national real estate company, investment firm or source of capital to create one to three wholly owned subsidiaries to implement the inventive method. According to this embodiment of the present invention, cell tower sites would either be sold or assigned to a subsidiary depending on the specific goal of each subsidiary and the nature of any existing lease. The subsidiaries would create two saleable entities having diametrically opposed functions, one to provide cash flow and the other for losses where investors would have incentive to pay to receive such cash flow or losses. In addition, the network may now have value to a real estate developer in such cases where purchase options or first rights of refusal were included in the lease agreement. This creates a third saleable entity or asset of value. The cash flow subsidiary will create the classic "Sale-Lease Back Opportunity" for the company. All three are profit centers, created from what is now a cash draining long-term liability that depresses the value of a Company's stock.

While the present invention is particularly well suited for the acquisition of property rights necessary for the erection of cell towers, the method is not limited to the acquisition of rights in real property but can be used for many large scale chain purchases. Cell tower networks are somewhat unique compared to other commercial real estate ventures by not involving properties controlled by commercial real estate developers. However, other real estate ventures are possible involving private landowners to which the method of the present invention can be generally applied.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for the build-out of a cellular network for a communications company, consisting of:
    (a) identifying two or more areas where cell towers for wireless communications are needed for a wireless communications network;
    (b) identifying within each area at least one desired location for positioning at least one cell tower,
    (c) identifying at least one private, non-commercial parcel of land to acquire through lease within each desired location;
    (d) calculating a total lease payment that is less than the aggregated projected periodic lease payment for each parcel of land over the term of use;
    (e) selecting for each parcel of land a lump sum payment amount up to the amount of said total lease payment to be used as a beginning point for negotiation;
    (f) tendering to each property owner a defined lease acquisition offer, comprising an offer to lease each parcel of land for a term of years with an immediate up-front payment of said lump sum, thereby decreasing the number and duration of payments needed to acquire the right to use said parcel of land;
    (g) repeating steps (a) through (e), until enough offers are accepted to build out said network;
    (h) leasing at least some of the parcels of land for which offers were accepted; and
    (i) erecting at least one cell tower on at least one leased parcel of land.

2. The method of claim 1, wherein said offer is to lease only a portion of each parcel of land comprising said desired location, and any necessary access.

3. The method of claim 1, wherein said offer is to lease said entire parcel of land.

4. The method of claim 1, wherein said lump sum payment offer is made in cash.

5. The method of claim 1, wherein said lump sum payment offer is made with negotiable securities.

6. The method of claim 5, wherein said negotiable securities are stock or stock options.

7. The method of claim 5, wherein said negotiable securities are one or more zero coupon bonds having an aggregate face value equal to said lump sum payment.

8. The method of claim 1, further comprising the step of financing said lump sum payment using negotiable securities as collateral.

9. The method of claim 1, wherein said selecting step comprises:
    determining the amount of debt encumbering each property; and
    selecting a lump sum payment amount up to the amount of debt encumbering each property to be used as a beginning point for negotiation.

10. The method of claim 1, wherein at least one offer further includes a first right of refusal for said company to purchase said parcel of land, or a portion of said parcel comprising said desired location, and any necessary access, when the owner receives a purchase offer for said parcel, for which said lump sum payment also serves as consideration.

11. The method of claim 1, wherein at least one offer further includes an option to be exercised by said property owner to sell to said company at a predetermined price said parcel of land, or a portion of said parcel comprising said desired location, and any necessary access, for which said lump sum payment also serves as consideration.

12. The method of claim 1, further comprising, when an offer is refused, the step of tendering to each refusing landowner an offer to lease their property for a term of years with periodic rental payments over the term of the lease, with the balance paid as a lump sum at a predetermined discount at the option of said landowner at any time during the term of the lease.

13. The method of claim 12, wherein at least one offer further includes a first right of refusal for said company to purchase said parcel of land, or a portion of said parcel comprising said desired location, and any necessary access, when the owner receives a purchase offer for said parcel, for which said lease payments also serve as consideration.

14. The method of claim 12, wherein at least one offer further includes an option to be exercised by said property owner to sell to said company at a predetermined price said parcel of land, or a portion of said parcel comprising said desired location, and any necessary access, for which said lease payments also serve as consideration.

15. The method of claim 1, wherein said offer is made to landowners currently leasing their property to said company for a term of years with periodic rental payments over the term of the lease less than one year before said lease is up for renewal.

16. The method of claim 1, wherein said offer is made to landowners currently leasing their property to said company for a term of years with periodic rental payments over the term of the lease more than one year before said lease is up for renewal.

17. The method of claim 1, wherein said offer is made to landowners currently not leasing their property.

18. The method of claim 1, wherein said offer does not include sharing of co-locator fees.

* * * * *